United States Patent

[11] 3,601,980

| [72] | Inventor | Egon Faber |
| | | Lucerne, Switzerland |
| [21] | Appl. No. | 851,340 |
| [22] | Filed | Aug. 19, 1969 |
| [45] | Patented | Aug. 31, 1971 |
| [73] | Assignee | Motoren-Und Turbinen-Union, |
| | | Friedrichshafen GmbH |
| | | Friedrichshafen, Germany |
| [32] | Priority | Aug. 23, 1968 |
| [33] | | Germany |
| [31] | | P 17 81 103.9 |

[54] POWER PLANT FOR SURFACE SKIMMERS AND HYDROFOILS
18 Claims, 1 Drawing Fig.

[52] U.S. Cl. .................................................. 60/11, 60/97 R, 115/37
[51] Int. Cl. ........................................................ F01k 23/14
[50] Field of Search ........................................ 60/11–13, 6, 97; 74/15.2, 664, 665; 416/169, 170; 115/37

[56] References Cited
UNITED STATES PATENTS

| 1,184,121 | 5/1916 | Parmeter ........................ | 74/664 X |
| 1,261,571 | 4/1918 | McDaniels ..................... | 74/664 |
| 1,402,875 | 1/1922 | McCallister ................... | 115/37 |
| 2,712,911 | 7/1955 | Herrick .......................... | 416/169 X |
| 3,388,684 | 6/1968 | Gros et al. ..................... | 60/11 X |

FOREIGN PATENTS

| 707,638 | 4/1954 | Great Britain ................ | 115/37 |

Primary Examiner—Martin P. Schwadron
Assistant Examiner—Allen M. Ostrager
Attorney—Craig, Antonelli, Stewart and Hill ABSTRACT: A drive installation for surface skimmers and hydrofoils in which a main engine, preferably a gas turbine drives a main propeller and an auxiliary engine, preferably a Diesel engine, drives an auxiliary propeller, and in which the main propeller is also driven by the auxiliary engine by way of a variable speed transmission and a further transmission with multiple inputs for the main engine and the auxiliary engine.

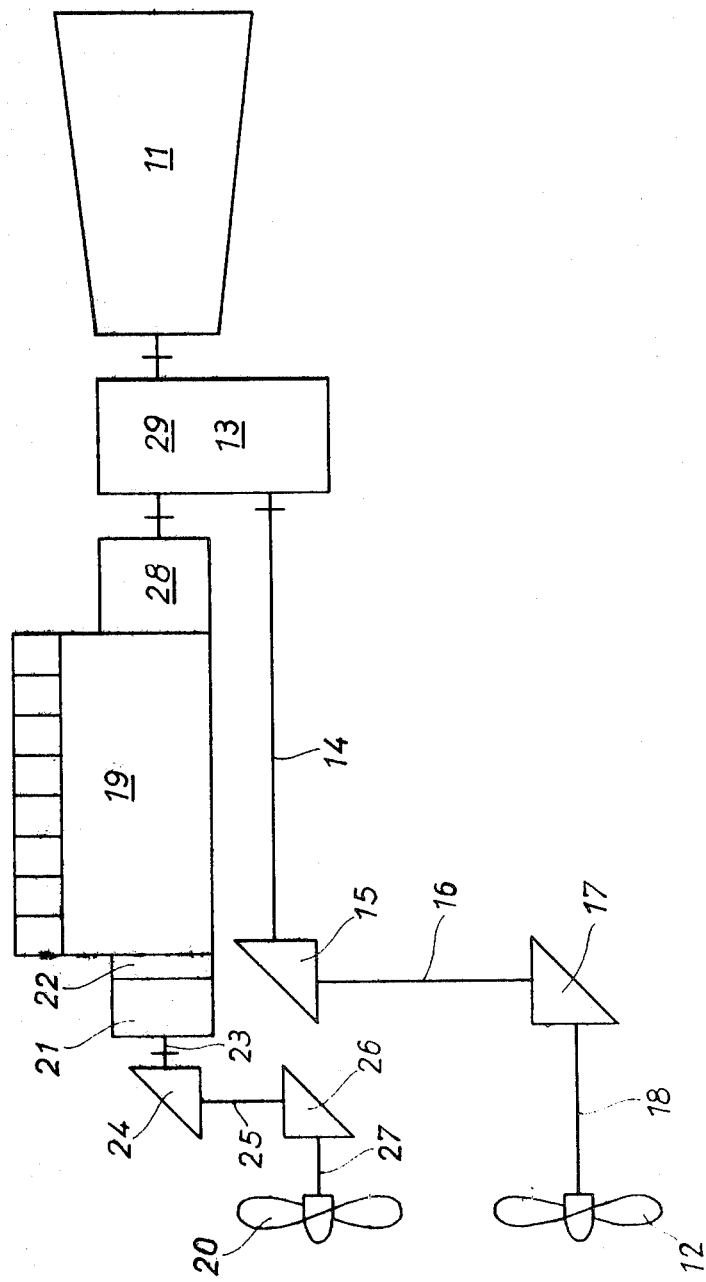

POWER PLANT FOR SURFACE SKIMMERS AND HYDROFOILS

The present invention relates to a drive installation for surface skimmers and hydrofoils.

Due to the low weight and small dimensions thereof, gas turbines are increasingly used as high-power drive means for high-speed boats. Especially in large hydrofoils, requiring an extreme lightweight construction, the use of gas turbines entails considerable advantages compared to other combustion engines.

Gas turbines have their best operating characteristics near their design point within a narrow range of rotational speed and power output. Consequently, in hydrofoils the power plant is dimensioned such as to operate the gas turbines at the design point thereof at the most frequently used cruising speed of the boat, that is the cruising speed under foil-borne operation, when the boat is lifted out of the water.

When operating in harbors with slow speed or under unfavorable weather conditions in high swells, hydrofoils are also used as displacement boats. When operated as a displacement boat, the power input and the rotational speed of the propeller is smaller corresponding to the lower speed, and very unfavorable operating conditions of the gas turbines and propellers designed for foil-borne operation, would result therefrom.

In order to avoid this disadvantage it is known in the prior art to utilize for the displacement operation, an auxiliary known plant or engine with relatively lower power output having its own, specially designed auxiliary propeller. With a view toward good maneuverability during swell in order to be able to cruise at a reasonable speed in case of failure or breakdown of the main power plant, this auxiliary power plant or engine produces approximately one-fifth of the main power output.

It is the aim of the present invention to achieve a most economical operation and a favorable power to weight ratio of the power plant or drive installation.

According to the present invention this is achieved in that during normal surface skimming or foil-borne operation at all main propeller speeds corresponding to the actual cruising speed of the boat, the auxiliary engine drives the main propeller, in addition to drive thereof by the main engine, by way of a multiple input gear arranged between the main engine and the main propeller and by way of a variable speed transmission, preferably by way of a hydrodynamic torque converter, arranged between the auxiliary driving engine the multiple input gear.

A preferred embodiment of the power plant, which entails an optimum efficiency of the power plant at all cruising speeds, essentially consists in that a hydrodynamic torque converter of the Trilok-principle (converter-coupling) is used a transmission with variable transmission ratio and in that the power train between the auxiliary engine and the main propeller includes additional mechanical gear means, arranged for example, in a speedup drive between the auxiliary engine and the input shaft of the torque converter or in the multiple input gear between the output shaft of the torque converter and the propeller shaft, so that at nominal speed of the auxiliary engine and at the propeller speed corresponding to the most frequently used cruising speed of the boat, the torque converter operates in its coupling range.

According to a further feature of the present invention an additional weight reduction of the power plant or drive installation can be achieved by conventionally combining the multiple input gear with the reduction gear, which is normally required in connection with gas turbines.

A favorable arrangement of the power plant according to the present invention results in that the auxiliary engine is arranged behind the main engine, i.e., following the main engine and in that the power takeoff is available at both engine ends of the auxiliary engine, i.e., at the front-end for the drive of the torque converter and at the other, rear end for the drive of the auxiliary propeller.

In order to stop the auxiliary propeller, which is lifted out of the water while the boat operates foil-borne, this auxiliary propeller is adapted to be uncoupled from the auxiliary engine.

These and further objects, features and advantages of the present invention will become more obvious from the following description when taken with the accompanying drawing which shows, for purposes of illustration only, one embodiment in accordance with the present invention, and wherein:

The single FIGURE is a schematic view of one embodiment of a drive installation in accordance with the present invention.

Referring now to the single FIGURE of the drawing, for normal foil-borne operation, a gas turbine 11 acts as the main power plant or driving engine for the main propeller 12. The high rotational speed of the gas turbine 11 is reduced to a suitable rotational speed appropriate for the main propeller 12 by means of a conventional reduction gear 13. To connect the reduction gear 13 with the main propeller 12 which is normally arranged in hydrofoils at a very low location, a shaft 14, an upper bevel gearing 15, a vertical shaft 16, a lower bevel gearing 17, and a propeller shaft 18 are used.

For operation a displacement boat at lower speeds, for example, in harbor areas or at high swell where foil-borne operation is not possible, or in case of malfunction or failure of the main power plant, a diesel engine 19 serves as auxiliary power plant or auxiliary driving engine together with an auxiliary propeller 20, which is arranged above the main propeller 12 and thereby emerges out of the water during foil-borne operation. A reversing gear 21 for maneuvering purposes and a clutch 22 for disengaging the auxiliary propeller 20 from the diesel engine 19 are arranged between the diesel engine 19 and the auxiliary propeller 20. As clutch 22 also shifting clutches belonging to the reversing gear 21 can be used. During foil-borne operation the separating clutch 22 is disengaged whereby a continuing rotation of the auxiliary propeller 20 is avoided.

The connection between the reversing gear 21 or the clutch 22 and the auxiliary propeller 20 is constituted by a shaft 23, an upper bevel gearing 24, a vertical shaft 25, a lower bevel gearing 26 and an auxiliary propeller shaft 27.

For the additional drive of the main propeller 12 by the diesel engine 19 during foil-borne operation, according to the present invention the power of the diesel engine 19 is taken-off from its front crankshaft end and drives the main propeller 12, by way of a conventional variable speed transmission 28 and a conventional multiple input gear 29 of any known construction which is combined with the reduction gear 13 in a conventional manner. By utilizing the additional output of the diesel engine, the continuous cruising speed of the boat can be increased, or a less powerful gas turbine can be used. In both cases, the specific weight of the power plant or drive installation is improved and the efficiency of the entire power plant or drive installation is increased by the especially favorable fuel consumption of the diesel engine.

Preferably, a conventional hydrodynamic torque converter is used for the variable speed transmission 28 whose steplessly variable speed ratio makes it possible to operate the diesel engine 19 with its full rated speed and nominal output at each rotational speed of the main propeller 12, which results in most favorable operating conditions, especially for supercharged diesel engines. Depending on output and rotational speed of the diesel engine, the dimensions of the latter can be kept small by increasing the torque converter input speed by means of an updrive, i.e., by means of a conventional speedup drive, between the diesel engine and the torque converter.

A particularly advantageous cooperation of the diesel engine with the gas turbine is achieved if a torque converter of the Trilok-principle (converter-coupling) is used. In this case, the transmission ratio of the mechanical transmission between the diesel engine 19 and output shaft of the multiple input gear 29 is designed in such a way that the Trilok-torque converter operates, at nominal rotational speed of the diesel engine 19 and at the main propeller speed corresponding to the most frequently used cruising speed of the boat, in its coupling range and thereby with optimum efficiency.

Advantageously, the mechanical transmission operable to obtain this transmission ratio is conventionally built into the multiple input gearbox 29, whence an additional transmission is obviated.

The diesel engine 19 is arranged in the direction of travel after the gas turbine 11, while reduction gear 13 is arranged between the gas turbine 11 and the diesel engine 19. Power takeoffs from the diesel engine 19 are available at both crankshaft ends; at the front end for the additional drive of the main propeller by way of the transmission 28 with variable ratio and the multiple input gear 29, and at the rear end for driving the auxiliary propeller 20 by way of the reversing gear 21 or by way of the clutch 22, respectively. This arrangement results in a very compact construction of the entire power plant or drive installation and also in short shaft connections between the individual components and units of the power plant or drive installation.

While I have shown and described only one embodiment in accordance with the present invention it is understood that the same is not limited thereto but is susceptible of numerous changes and modifications as known to those skilled in the art, and I therefore do not wish to be limited to the details shown and described herein but intend to cover all such changes and modifications which are within the scope of those skilled in the art.

I claim:

1. A drive installation for surface skimmers and hydrofoils, with at least one propulsion unit including a first internal combustion engine as main engine operable to drive a main propeller for normal surface skimming or foil-borne operation and a second internal combustion engine as auxiliary engine driving an auxiliary propeller for displacement operation, characterized in that at normal surface-skimming or foil-borne operation at all main propeller speeds corresponding to the actual cruising speed of the boat, the auxiliary engine drives the main propeller, in addition to the drive of the main propeller by the main engine, by way of a multiple input gear means arranged between the main engine and the main propeller and by way of a variable speed transmission means.

2. A drive installation according to claim 1, characterized in that the variable speed transmission means is a hydrodynamic torque converter arranged between the auxiliary engine and the multiple input gear means.

3. A drive installation according to claim 1, characterized in that said main engine is a gas turbine.

4. A drive installation according to claim 3, characterized in that said auxiliary engine is a Diesel engine.

5. A drive installation according to claim 4, characterized in that the variable speed transmission means is a hydrodynamic torque converter arranged between the auxiliary engine and the multiple input gear means.

6. A drive installation according to claim 1, characterized in that a hydrodynamic torque converter of the converter-coupling type is used as variable speed transmission means, and in that the power train between auxiliary engine and main propeller includes additional mechanical gear means so that at nominal speed of the auxiliary engine and at the propeller speed corresponding to the most frequently used cruising speed of the boat, the torque converter operates in its coupling range.

7. A drive installation according to claim 6, characterized in that the additional mechanical gear means is a speedup transmission means between the auxiliary engine and an input shaft of the torque converter.

8. A drive installation according to claim 6, characterized in that the additional mechanical gear means is arranged in the multiple input gear means between an output shaft of the torque converter and a propeller shaft for the main propeller.

9. A drive installation according to claim 6, characterized in that the multiple input gear means is combined with a reduction gear which is normally required with gas turbines.

10. A drive installation according to claim 9, characterized in that the auxiliary engine is arranged to the rear of the main engine and in that power takeoff is available at both ends of the auxiliary engine, namely at the front-end to drive the torque converter and at the other end to drive the auxiliary propeller.

11. A drive installation according to claim 10, characterized in that the auxiliary propeller can be uncoupled from the auxiliary engine by disengageable means.

12. A drive installation according to claim 11, characterized in that the additional mechanical gear means is a speedup transmission means between the auxiliary engine and an input shaft of the torque converter.

13. A drive installation according to claim 11, characterized in that the additional mechanical gear means is arranged in the multiple input gear means between an output shaft of the torque converter and a propeller shaft for the main propeller.

14. A drive installation according to claim 11, characterized in that said main engine is a gas turbine.

15. A drive installation according to claim 14, characterized in that said auxiliary engine is a Diesel engine.

16. A drive installation according to claim 1, characterized in that the multiple input gear means is combined with a reduction gear which is normally required with gas turbines.

17. A drive installation according to claim 2, characterized in that the auxiliary engine is arranged to the rear of the main engine and in that power takeoff is available at both ends of the auxiliary engine, namely at the front-end to drive the torque converter and at the other end to drive the auxiliary propeller.

18. A drive installation according to claim 17, characterized in that the auxiliary propeller can be uncoupled from the auxiliary engine by disengageable means.